United States Patent [19]
Griffith

[11] 3,887,684
[45] June 3, 1975

[54] REMOVAL OF SULFUR DIOXIDE FROM WASTE GASES

[75] Inventor: Frank S. Griffith, Palmerton, Pa.

[73] Assignee: The New Jersey Zinc Company, Palmerton, Pa.

[22] Filed: Sept. 28, 1973

[21] Appl. No.: 401,747

[52] U.S. Cl. ............... 423/242; 423/512; 423/541; 423/622; 423/544
[51] Int. Cl. ............................................ C01b 17/00
[58] Field of Search ......................... 423/242–244, 423/622, 512, 541

[56] References Cited
UNITED STATES PATENTS

| | | | |
|---|---|---|---|
| 931,515 | 8/1909 | Sprague | 423/244 |
| 984,498 | 2/1911 | Sprague | 423/244 |
| 3,441,370 | 4/1969 | Gutmann et al. | 423/244 |

OTHER PUBLICATIONS
Chemical Abstracts, Vol. 60, 6524k, 1964.

*Primary Examiner*—Oscar R. Vertiz
*Assistant Examiner*—Gregory A. Heller
*Attorney, Agent, or Firm*—Charles I. Sherman

[57] ABSTRACT

In a process for removing sulfur dioxide from dilute sulfur dioxide gases, the gases are brought into contact with an aqueous solution of zinc sulfate which absorbs the sulfur dioxide, and the absorption products are then partially or fully removed. The aqueous solution may then be recirculated into contact with additional waste gases to produce a cyclic process.

10 Claims, 1 Drawing Figure

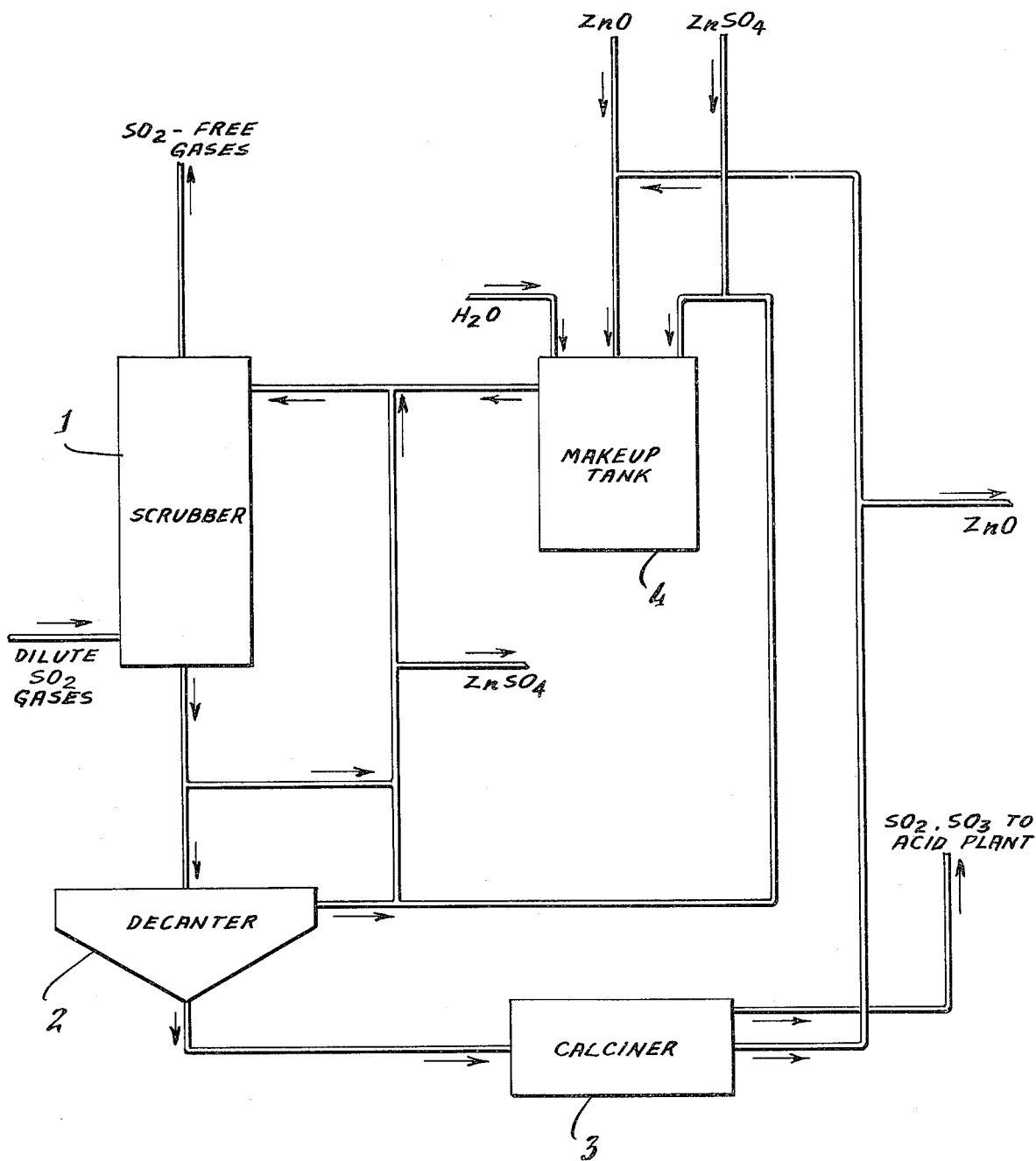

REMOVAL OF SULFUR DIOXIDE FROM WASTE GASES

BACKGROUND AND SUMMARY OF THE INVENTION

One of the most objectionable air pollutants and one most difficult to control is sulfur dioxide. Estimates are that in excess of 25 million tons of sulfur dioxide per year have been discharged into the atmosphere from various sources including combustion of sulfur bearing fuels, tail gases from sulfuric acid producing plants, the gases emanating in certain pyrometallurgical operations, etc. Gases containing more than about two percent sulfur dioxide have long been treated by direct conversion to sulfuric acid either by the chamber process or by the contact process. Dilute gases; i.e., those containing smaller amounts of sulfur dioxide, as for example the flue gases resulting from combustion of high sulfur coals, are, however, a major source of pollution in that they are normally discharged directly into the atmosphere. It is to the removal of sulfur dioxide from such dilute gases that the present invention is directed.

A variety of processes have been proposed for removal of sulfur dioxide from dilute gas streams. Adsorption on solids is one such process, but it requires low gas velocities in order to avoid excessive pressure drops during passage through adsorbent beds. The high attrition losses of the adsorbent and the high cost of the equipment required to handle the large volume of hot gases, particularly those evolved in periodically regenerating the adsorbent, have presented serious problems. Adsorption on solids dispersed in a gas stream has further been found to be inefficient and poses additional problems in collection of the dust.

Greater attention has been absorption on adsorption processes to reduce the sulfur dioxide content of dilute gases to non-polluting levels. These may be classified into two categories, the non-cyclic or effluent processes and the cyclic or non-effluent processes.

In the effluent processes, no attempt is made to recover the sulfur dioxide or the absorbent, and the required washing with water proves to be very expensive due to the low solubility of sulfur dioxide. In commercial practice, enormous quantities of water and an absorption apparatus of large volume is required. Such a process is limited in application to sites where water is available in quantity sufficient to carry away the effluent without detriment to the environment. Such sites have become practically non-existent. The limitations imposed by low sulfur dioxide solubility may be avoided by using an alkaline medium such as a slurry of slaked lime as the absorbent. This, however, introduces a reagent requirement and generates a calcium sulfite-calcium sulfate solid waste which presents disposal problems of its own. In addition, calcium sulfate is notorious for its tendency to scale and plug equipment, thereby introducing serious operating problems.

The non-effluent or cyclic processes circumvent the disposal problem by regeneration and subsequent recirculation of the absorbent media. Various alkalis have been proposed as the absorbent media including ammoniacal solutions, solutions of caustic soda or potash, as well as slurries of lime, magnesium oxide or manganese dioxide. Generally, the aim is to form a sulfite or bisulfite from which sulfur dioxide may be rather conveniently stripped either by heat or chemical reaction, thereby regenerating the absorption media for reuse. Unfortunately, due to the presence of oxygen in the dilute gases, appreciable oxidation of sulfite to sulfate occurs. Sulfates generally do not have sufficient sulfur dioxide absorbing capacity and are generally more difficult to decompose; they must, therefore, be purged from the system. An excessive absorbent makeup requirement has thus rendered many of the proposed cyclic processes economically impractical. In some instances, addition of antioxidants has been proposed to retard sulfate formation in an attempt to reduce the excessive makeup requirement.

An example of a cyclic or regenerative process is disclosed in U.S. Pat. No. 2,161,056 to H. F. Johnstone and A. D. Singh, and further reported in the University of Illinois Engineering Experiment Station Bulletin No. 324 (Volume XXXVIII, No. 19, Dec. 31, 1940). This process is based upon the absorption of sulfur dioxide in a sodium sulfite solution. After clarification to separate any solids removed from the gases along with the sulfur dioxide, the resulting sodium sulfite-sodium bisulfite solution is regenerated by chemical reaction to remove sulfur dioxide from solution. Zinc oxide has been found to be a most suitable reagent in that the insoluble zinc sulfite which forms in the regeneration reaction is readily decomposed to zinc oxide and sulfur dioxide by heating. However, in the operation of this process, the inevitable oxidation of the dissolved sulfur dioxide again presents serious problems. In fact, it has been reported that as much as 10 percent of the sulfur dioxide may be converted to sulfate in the absorption process, and an additional 10 percent may be oxidized in the handling of the zinc sulfite. Accordingly, a separate desulfating step involving addition of lime was proposed.

Since zinc oxide forms insoluble, readily decomposable zinc sulfite, it seemed to the present inventor that a slurry of zinc oxide might still offer interesting possibilities in the removal of sulfur dioxide from dilute gases. A slurry of zinc oxide was indeed found to be highly effective; however, as in the other systems, oxidation occurred and the highly water soluble zinc sulfate formed along with the zinc sulfite. Nevertheless, contrary to every expectation, it was surprising to find that, under certain conditions, the zinc sulfate improved the absorption of the sulfur dioxide, and while the decomposition of zinc sulfate requires higher temperatures than for zinc sulfite, these temperatures are commercially practicable. It is these discoveries which form the basis for the present invention.

Accordingly, representative objects of the present invention are to provide a process for recovering sulfur dioxide from dilute sulfur dioxide gases, such as waste gases, which process is economical, effective, applicable to commercial operations, capable of operating in a cyclic or regenerative manner, and consistent with efforts to control environmental pollution.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

BRIEF DESCRIPTION OF THE DRAWING

For a fuller understanding of the nature and objects of the invention, reference should be had to the following detailed description taken in connection with the accompanying drawing in which there is shown a schematic representation of a sulfur dioxide removal process in accordance with the invention.

DESCRIPTION OF THE PREFERRED EMBODIMENTS

The increased effectiveness for sulfur dioxide absorption in a zinc sulfate solution may be demonstrated by a laboratory experiment wherein equivalent slurries of zinc sulfite in water and in two molar zinc sulfate undergo sulfur dioxide desorption by bubbling nitrogen therethrough. The sulfuric acid formed by absorption in hydrogen peroxide of the sulfur dioxide in the off-gas is determined by titration with a standardized base. In Table 1 which follows, the percent sulfur dioxide in the off-gas is recorded:

Table 1

| pH | Temp. °C | $ZnSO_3$ Slurried in Water | 2M $ZnSO_4$ |
|---|---|---|---|
| 4.5 | 40 | 0.018% | 0.000% |
| 5.0 | 40 | 0.0025% | 0.000% |
| 5.0 | 50 | 0.017% | 0.004% |
| 5.5 | 50 | 0.0025% | 0.0009% |

The higher figures for the water slurries demonstrate a higher partial pressure of sulfur dioxide thereabove, consequently indicating decreased absorption potential than is the case with the zinc sulfate solution.

In another series of experiments, it was found that under otherwise fixed conditions, absorption of sulfur dioxide in zinc sulfate solution containing zinc sulfite varies with the temperature of the solution and its pH as shown in Table 2 which follows, wherein the concentrations of sulfur dioxide remaining in the effluent gas stream are recorded:

Table 2

| | pH | | | |
|---|---|---|---|---|
| | 4.5 | 5.0 | 5.25 | 5.63 |
| 40°C | 0.019% | 0.0015% | | |
| 50°C | | 0.0093% | 0.0070% | |
| 60°C | | | 0.036% | 0.0074% |

It will be noted that decreasing temperature and increasing pH result in decreasing sulfur dioxide content in the effluent gases, the operable range depending upon the concentration of sulfur dioxide desired in the effluent gases. In that regard it will be noted that the requirement of limiting sulfur dioxide in effluent gas streams to 500 parts per million, sometimes cited by various regulatory agencies, is met under all of the above conditions.

The temperature of zinc sulfate solution may be maintained at the desired level by any conventional means. Maintenance of the pH was found to be most conveniently and economically accomplished by addition of zinc oxide; the zinc oxide is thought to form with the zinc sulfate, the so-called basic zinc sulfate represented by the formula $(ZnO)_x \cdot ZnSO_4$ wherein $x$ is generally about three. This compound exhibits substantial solubility in normal zinc sulfate solution, the solubility being a function of the normal zinc sulfate concentration and of the temperature of the solution.

In still another experiment a solution of zinc sulfate calculated to be a saturated solution, was prepared from zinc oxide and sulfuric acid; analysis showed that it was approximately three molar in zinc sulfate concentration. A gaseous mixture of approximately four percent sulfur dioxide in air was passed through this solution using a turbo-type impeller to disperse the gas. As the pH of the zinc solution tended to decrease, zinc oxide was added to maintain the pH above about 4. After gassing for about two hours, coarse rectangular crystals began to separate from solution. Upon analysis, these were found to be a mixture of zinc sulfite and zinc sulfate. The exact ratio of sulfite to sulfate is open to question in that oxidation during analysis is a distinct possibility. In any event as sulfur dioxide is absorbed, zinc oxide is consumed leading to the formation of zinc sulfite and zinc sulfate, the relative proportions of which depend upon the oxidizing potential of the gas stream. The ratio of zinc sulfite to zinc sulfate is of little if any importance in that the crystals readily separate from solution and as indicated previously, while zinc sulfate requires a somewhat higher temperature for conversion to zinc oxide and the oxides of sulfur, this temperature is commercially practicable, being within the range normally encountered in the roasting of zinc sulfide concentrates.

Referring now to the drawing wherein a flow scheme for a process for removing sulfur dioxide from waste gases in accordance with the invention is illustrated, gases containing sulfur dioxide in dilute concentration, that is, less than about two percent by volume, are brought into intimate contact with the sulfur dioxide absorbing medium in the scrubber 1. Any conventional type of gas absorption equipment may be employed including spray towers or towers packed with broken stone, coke or various stoneware shapes; a series of such towers may be of advantage, the gases and absorbing media being passed therethrough.

The sulfur dioxide absorbing medium may comprise, at least initially, a slurry of zinc oxide in water or a solution of zinc sulfate formed, as for example, by partially acidifying a zinc oxide slurry with sulfuric acid. The absorption of sulfur dioxide in this medium results in the formation of zinc sulfite and depending upon the oxidation potential of the gas stream, a quantity of zinc sulfate also forms. With continued absorption of sulfur dioxide, the acidity of this solution increases with a corresponding reduction in capacity for further sulfur dioxide absorption; sustained capacity for absorption requires maintenance of the pH of this solution above about 4. As indicated previously, the pH is most conveniently maintained at the desired level by addition of zinc oxide. The zinc oxide and the zinc sulfate in solution are thought to form the so-called basic zinc sulfate, a compound represented by the formula $(ZnO)_x \cdot ZnSO_4$ wherein $x$ is generally about three. With further sulfur dioxide absorption and further additions of zinc oxide, the solubility of zinc sulfite is soon exceeded and eventually even that of the more soluble zinc sulfate. Coarse crystals, comprising a mixture of both zinc sulfite and zinc sulfate, readily separate leaving a supernatant liquid containing, in solution, normal zinc sulfate plus an incidental and comparatively minor quantity of the inherently insoluble zinc sulfite and also, depending upon its history in the process, some basic zinc sulfate in solution and possibly some unreacted zinc oxide in suspension.

The term "aqueous solution of zinc sulfate" as used herein in the specification and claims is intended to comprise the composition of the supernatant liquid set forth above.

The operation of the process is somewhat independent of the zinc concentration in the aqueous solution of zinc sulfate in that sulfur dioxide is absorbed to some extent even in dilute solutions. Reduction of the sulfur dioxide in the effluent gases to non-polluting levels would generally require a volume of dilute solution greater than would be the case with a more concentrated solution. For most efficient operation therefore, a concentration of above about 2 percent by weight of zinc in solution is preferred.

Sulfur dioxide absorption as it is related to the concentration of sulfur dioxide in the effluent gases is also affected by temperature in that increasing temperature results in decreasing absorption. Solution temperatures at or even slightly above normal room temperature are preferred; however, temperatures as high as 60°C or even 70°C resulting from contact of warm gas with the solution are entirely satisfactory.

The solution exiting the scrubber may be recirculated, or if crystals have begun to appear, it may be passed to a decanter 2 wherein separation of the zinc sulfite-zinc sulfate mixed crystals is effected. Various types of liquid-solid separation equipment may be employed including thickeners, centrifuges and filters. The zinc sulfite-zinc sulfate solids are then passed to calciner 3 wherein they are heated to a temperature sufficient to effect decomposition into zinc oxide and the oxides of sulfur. Various types of equipment commonly employed in the metallurgical industries for roasting of sulfide concentrates may be utilized. In fact, the zinc sulfite-zinc sulfate product may be incorporated into the zinc sulfide concentrate feed to a roasting operation. The sulfur oxide gas stream exiting calciner 3 may then be passed to a contact plant for the manufacture of sulfuric acid. Makeup tank 4 is provided for preparation and adjustment of the zinc sulfate solution as shown in the drawing.

In certain instances, the production of zinc sulfate or hydrate thereof as a commercial product may be desirable. In such cases, part or all of the solution may be withdrawn from the scrubber and may be independently subjected to further processing; the concentration of zinc sulfate in the solution can be advantageously allowed to approach saturation with consequently less water to be removed in drying.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described my invention, what I claim as new and desire to secure by Letters Patent is:

1. A process for recovering sulfur dioxide from dilute sulfur dioxide gases, comprising:
    a. contacting said gases with an aqueous solution of zinc sulfate in which the concentration of zinc in and the pH of, the aqueous solution of zinc sulfate is maintained, by the addition of a zinc oxide containing material, at levels sufficient to produce a zinc sulfite-zinc sulfate precipitate, and
    b. absorbing sulfur dioxide from said gases in said aqueous solution of zinc sulfate,
    c. removing said precipitate from said aqueous solution of zinc sulfate.

2. A process as defined in claim 1 wherein the concentration of zinc in the aqueous solution of zinc sulfate is maintained above about 2 percent by weight.

3. A process as defined in claim 1 wherein the pH of the aqueous solution of zinc sulfate is maintained above about 4.

4. A process as defined in claim 1 wherein the pH of the aqueous zinc sulfate solution is maintained by addition of zinc oxide.

5. A process as defined in claim 1 wherein the temperature of the aqueous zinc sulfate solution is maintained between normal room temperature and about 70°C.

6. A process as defined in claim 1 wherein the zinc sulfite-zinc sulfate precipitate is removed and heated to a temperature sufficient to effect decomposition of same into zinc oxide and oxides of sulfur.

7. A process as defined in claim 1 wherein the aqueous zinc sulfate solution, after removal of the zinc sulfite-zinc sulfate precipitate, is returned to contact with additional dilute sulfur dioxide gases.

8. A process as defined in claim 1 wherein at least a portion of the aqueous solution of zinc sulfate is removed after contact with the dilute sulfur dioxide gases for production of commercial zinc sulfate or hydrate thereof.

9. A process for recovering sulfur dioxide from dilute sulfur dioxide gases, comprising:
    a. contacting said gases with an aqueous solution of zinc sulfate,
in which the concentration of zinc in the aqueous solution of zinc sulfate is maintained above about 2 percent by weight and the pH of said aqueous solution is maintained above about 4 by addition of zinc oxide,
    b. absorbing sulfur dioxide from said gases in said aqueous solution of zinc sulfate, and
    c. removing at least a portion of the absorption products from said aqueous solution of zinc sulfate.

10. A process as defined in claim 9 wherein the temperature of the aqueous zinc sulfate solution is maintained between normal room temperature and about 70°C.

* * * * *

UNITED STATES PATENT OFFICE
CERTIFICATE OF CORRECTION

PATENT NO. : 3,887,684
DATED : June 3, 1975
INVENTOR(S) : Frank S. Griffith

It is certified that error appears in the above-identified patent and that said Letters Patent are hereby corrected as shown below:

Column 1, line 35, delete "absorption on adsorption" and insert therefore --focused on absorption--

Signed and Sealed this sixteenth Day of September 1975

[SEAL]

Attest:

RUTH C. MASON
*Attesting Officer*

C. MARSHALL DANN
*Commissioner of Patents and Trademarks*